Patented Nov. 24, 1942

2,302,980

UNITED STATES PATENT OFFICE 2,302,980

PROCESS FOR BRIQUETTING ALUMINUM
AND ALUMINUM ALLOY SCRAP

Max Stern, New York, N. Y.

No Drawing. Application September 13, 1940, Serial No. 356,665. In France January 26, 1940

2 Claims. (Cl. 75—68)

This invention relates to an improved process for producing briquettes from aluminum and aluminum alloy scrap such as turnings, chippings or borings without the use of binding or agglomerating agents.

It is broadly known to form by compression metal scrap into shaped bodies.

The invention therefore is based on the recognition that light metal scrap must be heated to a certain temperature range if firmly coherent, compact shaped bodies or briquettes are to be obtained by compression, the specific weight of which is approximately the same of the original metal and the original crystalline structure of which remains unchanged.

It is accordingly an object of the invention to press aluminum and aluminum alloy scrap at elevated temperatures into shaped bodies.

It is a further object of the invention to provide a novel process for briquetting aluminum and aluminum alloy scrap which includes heating the scrap to a temperature of above 250° C. and below the melting point of the metal as well as below the point at which the metal will substantially oxidize.

It is still an object of the invention to provide an improved process of compressing heated aluminum and aluminum allow scrap whereby a specific gravity of the shaped bodies is reached which is substantially the same as that of the solid metal.

The aluminum or aluminum alloy scrap is heated to a temperature of about at least 300° C. and preferably about 300 to 370° C. whereupon the scrap is pressed in to blocks.

The metal scrap is preferably heated in a non-oxidizing atmosphere and therefore it is advisable to prevent an oxidizing atmosphere from gaining access to the scrap to be treated. This result may be obtained by conducting the heating treatment in muffle kilns or furnaces or else in ovens wherein the scrap is enclosed in airtight crucibles or receptacles. For the above purpose it is generally sufficient if the scrap is protected in any suitable manner from the oxidizing influence of the surrounding air.

It is also possible to convey the necessary heat to the metal scrap by the shaping equipment for instance by a heated die provided with a punch or the like pressing device. After the scrap has been heated in the die it is immediately compressed to the required shape. In this case the die should have a suitable heating device which may for instance be an electrical furnace arranged within the walls of the die.

Impurities contained in the scrap such as moisture, oil, organic particles or gases are removed from the scrap during the heating procedure. These impurities may also be evacuated in any suitable manner.

Preferably the heated scrap is charged into a die and is compressed therein by means of a hydraulic press or a steam or air hammer. The pressing member of the hydraulic press or of the hammer has the same cross section as the blocks or bars to be formed and fits into the die.

The specific gravity of the briquettes obtained by my novel process approximates that of the metal or metal alloy of which the scrap was made up.

*Example*

Duralumin chips having a weight of about 400 kg. per cubic meter are charged into a small rotary furnace. The furnace has an internal diameter of about 50 cm. and a length of about 4 m. The inclination of the furnace is about 15°. Below the furnace a raw oil burner is provided having an adjustable air valve. With this heating source the scrap may be heated by a reducing flame. In the rotary furnace the chips are heated to a temperature of about 350° C. and thereafter charged into a cylindrical die. The die has a diameter of 9 cm. and a height of 40 cm. The die is preferably mounted on the base plate of an air hammer serving as a punch. The punch has a diameter of 8.9 cm. The heated scrap is compressed by the repeated impacts of the hammer top having a weight of 150 kg. After 4 to 5 strokes of the hammer top the scrap is compressed to a cylindrical block having a height of 6 cm. The thus obtained block can easily be removed from the die.

The aluminum briquettes obtained as stated above have a specific gravity of about 2.7. The briquettes obtained by my novel process do not contain any moisture, impurities, or oil because such matter is removed by the heat treatment.

I claim:

1. Process for producing briquettes from aluminum and aluminum alloy scrap such as borings, chippings and turnings coated with oxide skins comprising de-oiling the scrap, heating the de-oiled oxide covered scrap particles during the compressing stage to at least about 300° C. to soften the body of the metal particles encased in the said oxide skins so as to weaken the support given by the encased metal to the said skins, applying at the same time briquetting pressure to the scrap heated to the said temperature of at least 300° C. in order to disrupt the said oxide skins of the individual scrap particles and to form a homogeneously bonded body of metal with the said oxide skins of the individual scrap particles uniformly distributed in the form of discrete particles throughout the homogeneous body of metal.

2. A briquette consisting of aluminum or aluminum alloy scrap such as oxide coated borings, chippings and turnings in the form of a homogeneously bonded metal body constituted of the individual de-oiled scrap particles coalesced to each other by being heated during the compressing stage to at least about 300° C. which causes the oxide coatings of the individual scrap particles to become disrupted the said oxide coatings being present in the form of discrete pieces uniformly distributed throughout the said homogeneously bonded metal body.

MAX STERN.